United States Patent

Reid

[15] 3,656,127

[45] Apr. 11, 1972

[54] MEMORY PLANE

[72] Inventor: Gilbert R. Reid, Norristown, Pa.

[73] Assignee: Sperry Rand Corporation, New York, N.Y.

[22] Filed: May 4, 1970

[21] Appl. No.: 60,541

Related U.S. Application Data

[63] Continuation of Ser. No. 426,050, Jan. 18, 1965

[52] U.S. Cl. ............340/174 PW, 340/174 AD, 340/174 M, 340/174 VA

[51] Int. Cl. ....................................G11c 11/04, G11c 11/14

[58] Field of Search ..........................................340/174 PW

[56] References Cited

UNITED STATES PATENTS

| | | | |
|---|---|---|---|
| 3,460,113 | 8/1963 | Maeda | 340/174 PW |
| 3,197,749 | 7/1965 | Clinehens et al. | 340/174 PW |
| 3,414,972 | 12/1968 | Reid et al. | 340/174 PW |
| 3,371,326 | 2/1968 | Fedde | 340/174 PW |
| 3,465,308 | 9/1969 | Yozo Sasaki et al. | 340/174 PW |

*Primary Examiner*—James W. Moffitt
*Attorney*—Charles C. English, Rene A. Kuypers and William E. Cleaver

[57] ABSTRACT

There is disclosed an apparatus which houses a delicate memory element which is the size of a human hair. The apparatus is characterized by high packing density on the order of 25–50 elements to the inch. Parallel, enclosed channels are formed in an insulating material and are dimensioned so that the magnetizable wires are held in position therein without being stressed during variations in temperature as well as for facile insertion and removal both during manufacturing and repair operations.

6 Claims, 6 Drawing Figures

INVENTOR
GILBERT R. REID

BY Rene A. Kuypers
ATTORNEY

MEMORY PLANE

This invention relates in general to the fabrication of a memory plane and in particular the invention relates to the fabrication of a memory plane which utilizes wires having a magnetic covering.

One of the difficulties encountered in fabricating a memory plane utilizing small diameter wires, having a magnetic coating (hereinafter referred to as plated wires), on the order of 5 mils in diameter, is that great care must be exercised in the handling thereof. Also, the support member or receptacle for such a delicate memory element (about the size of a human hair) must be such that dense packing on the order of 25–50 per inch can be obtained with relative ease. In general, the support member must be designed to minimize all stresses upon the plated wire since any stress can effect its magnetization. The support member should also minimize problems of replacement whenever a memory element is defective. An ideal support member for a plated wire memory plane must also be characterized by low cost initial assembly. Additionally, the blockage of various grooves must be held to a minimum.

Accordingly, it is an object of this invention to provide a new and improved memory plane.

It is another object of this invention to provide a memory plane which is characterized by ease and simplicity of manufacture.

It is still a further object of this invention to provide a memory plane which is economical to fabricate.

It is yet another object of this invention to provide a memory plane which simplifies replacement of defective memory elements of a plane.

In accordance with a feature of this invention, there is provided a technique for fabricating a plated wire memory plane which consists of sandwiching a plurality of small diameter wires between two sheets of insulation. The two sheets of insulation are bonded to one another so as to form a unitary structure. After the sandwich has been cured, the wires are removed from the sandwich thereby forming a plurality of channels or cavities. Small diameter plated wires of approximately 5 mils are then threaded through the cavities remaining in the sandwich. In other words, the plated wires are embedded in the sandwich. The plated wires are slightly smaller in diameter than the resulting cavities so that they may be readily inserted therein without buckling. After the plated wires are inserted in the sandwich, a flat printed circuit, or cable, with many conductors is bonded around the outside of the sandwich so that the individual conductors of the cable are orthogonal to the plated wires. As is understood in the art, the individual printed circuit conductors of the cable each comprises a word solenoid and the intersection of a word solenoid and a plated wire comprises a bit of a memory word. A binary zero or binary one may be stored in any of the above-mentioned bit positions.

The novel features that are considered characteristic of this invention are set forth with particularity in the appended claims. The invention itself, however, both as to its organization and method of operation, as well as additional objects and features thereof, will best be understood from the following description when considered in conjunction with the accompanying drawings, wherein:

FIG. 2 is a schematic representation of the elements comprising FIG. 1;

Figures 1, 2A, 2B:
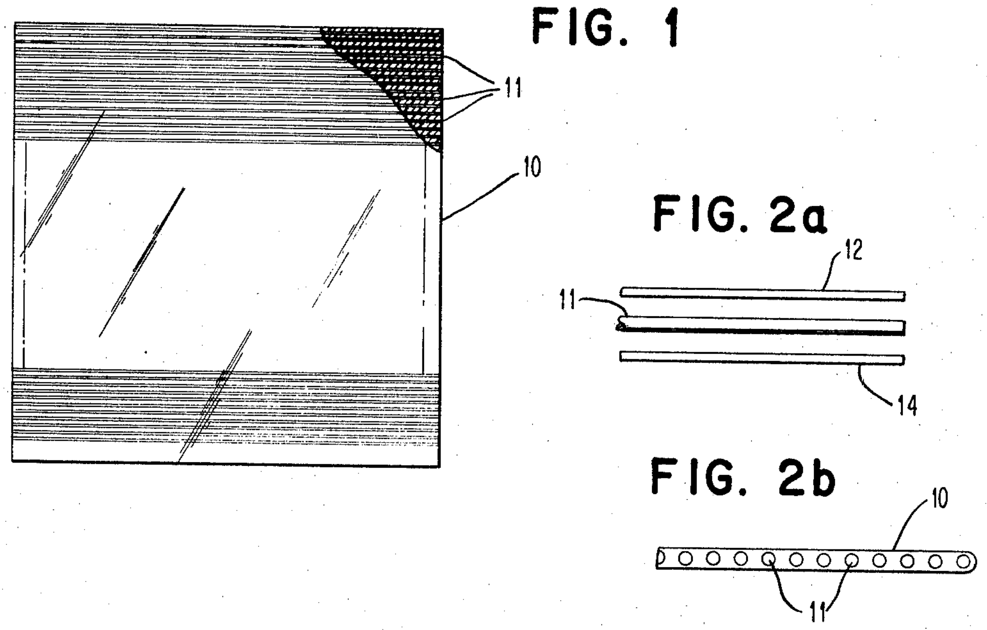
FIG. 1 is a plan view of the sandwich incorporating a plurality of embedded wires.

FIG. 2*b* is a side view of the sandwich of FIG. 1 and FIG. 2*a;*

Figure 3:
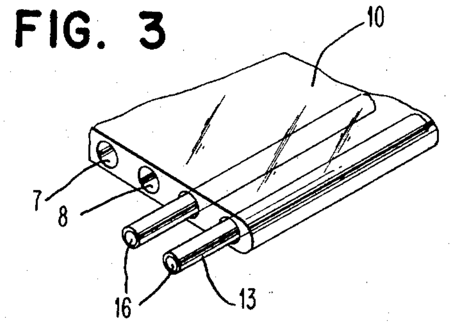
Figure 4:
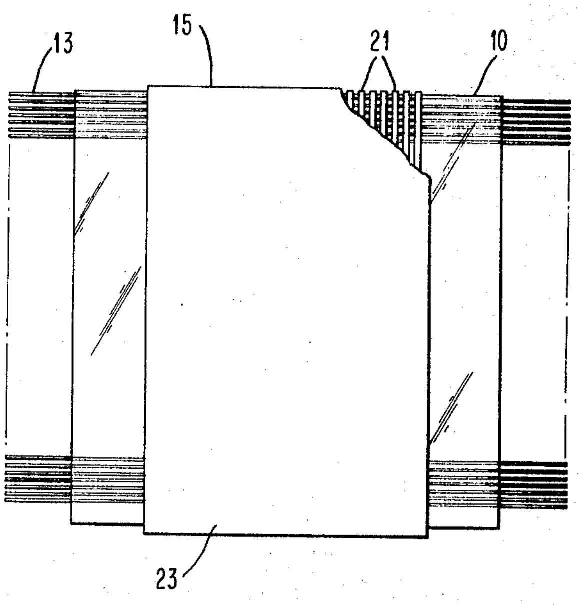

FIG. 3 is a portion of FIG. 1 showing the cavities remaining after the original wires have been extracted. Two plated wires are inserted in two of the cavities;

FIG. 4 shows the memory plane of this invention comprising the printed circuit conductor cable positioned around the sandwich of FIG. 3.

Figure 5:
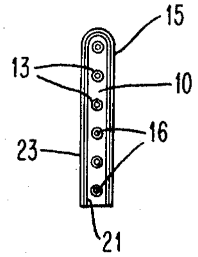

FIG. 5 is a side view of the memory plane of FIG. 4.

Referring now to FIG. 1, there is depicted a sandwich 10 having a plurality of small diameter wires 11 embedded therein. The wires 11 are positioned in parallel and very close to one another so that high packing density may be obtained.

FIG. 2*a* is a schematic representation of the sandwich of FIG. 1 and shows the relationship of the various elements. Thus, in order to fabricate the sandwich 10, two sheets of thermoplastic 12 and 14 are positioned on either side of a plurality of small diameter wires 11. The wires 11 may be of the order of 8 mils in diameter. The thermo-plastic sheets 12 and 14 are then bonded to one another and cured so as to form a unitary structure. A side view of the arrangement in FIG. 2*a* is shown in FIG. 2*b*.

After the wires 11 are fused into an arrangement depicted in FIG. 2*b*, the wires are removed from the sandwich by appropriate means so that a plurality of channels or cavities remain. FIG. 3 provides an appreciation of this step of the method, whereby the cavities 7 and 8 remain in the sandwich 10 after the wires have been removed. The wires 13, having a magnetic coating 16 incorporating the property of uniaxial anisotropy, are then threaded through the cavities left by the previously removed wires. The reason that the plated wires 13 are not inserted originally into the sandwich 10 is that the bonding and curing step discussed with respect to FIG. 2*a* and 2*b* would destroy or damage the magnetic coating of the wires. Also, the plated wires 13 sometimes have bad spots and therefore must be readily replaced. If the plated wires were originally placed in the sandwich, this would not be readily feasible. The magnetically coated wires 13 (i.e., plated wires) are conventionally 5 mil diameter beryllium copper elements. Each element is electroplated with approximately a 10,000 Angstrom thickness of a nickel-iron alloy (80 percent nickel — 20 percent iron). The alloy coating is electroplated in the presence of a circumferential magnetic field that establishes a uniaxial axis at right angles (i.e., around the circumference) to the length of the wire. The uniaxial anisotropy establishes an easy and hard direction of magnetization. The film's magnetization vectors for magnetic moment is thereby oriented in one of two equilibrium positions along the easy axis. This magnetic orientation establishes two bistable states necessary for binary logic applications. Since, the plated wire 13 is of somewhat smaller diameter than the cavities 7 and 8, it can be readily threaded through the cavities without bending or stressing it. This is an important aspect of this invention, since the magnetic coating can be destroyed or damaged if it is in any way bent or stressed. The reason for the relative ease with which the plated wires 13, despite their delicacy, can be threaded into the memory plane 10 is that the cavities are well formed by the removal of the regular wires 11. Furthermore, since the channels 7 and 8 are formed with a minimum of rough edges, the plated wires 13 are inserted with a minimum of blockage.

FIG. 4 represents a complete memory plane embodiment in accordance with this invention. Thus, the sandwich 10 if provided wherein each of the cavities have been filled with a plated wire 13. In accordance with the practice in the art, one end of each plated wire 13 is connected to a terminating network (not shown) and the other end thereof is connected to a bit-sense matrix select circuit (not shown). Such a terminating network may comprise, by way of example, a resistor which is matched to the impedance of the plated wire 13. The bit-sense matrix selection circuit is conventionally employed to select a single plated wire 13 of a group during a read or write cycle.

Placed substantially orthogonal and around the sandwich 10 is a flat conductor cable 15. The flat conductor cable 15 comprises a sheet of Mylar upon which had been etched a plurality of parallel copper lines 21. The copper lines 21 are utilized to read-out the information bits (i.e., a binary zero or one) stored on the plated wires 13 during a memory read-out cycle and are further utilized during a write cycle in conjunction with a digit current in the plated wire 13 to record new information. The intersection of a word solenoid 21 and a plated wire 13 is conventionally termed a bit position. Several memory words are positioned under each word solenoid 21 and the required word is selected by the above-mentioned bit-sense matrix selection circuit (not shown).

FIG. 5 depicts a sectional view of the complete memory plane embodiment of FIG. 4. Thus, the word solenoid conductors 21, which are printed upon the Mylar base 23, are wrapped around the sandwich 10.

In view of the above description, it is apparent that the memory plane shown in FIGS. 4 and 5 is relatively simple and economical to fabricate. This results from the fact that many bits are provided at the intersection of the plated wires 13 and the drive lines 21. This, for example, is to be contrasted with a ferrite core memory plane which requires each core to be individually threaded with various wires.

An alternate method of constructing the memory plane depicted in FIG. 4 is to bond the flat conductor cable 15 around the sandwich 10 but without removing the original wires 11 therefrom. After the two units are completely joined to one another, the oversize wires are removed and the plated wires are inserted in their place. This method of fabrication prevents damage to the plated wires 13 during the placing of the flat conductor cable 15 in position over the sandwich 10.

In summary, the instant invention provides a technique for making a memory plane which comprises making a thin sandwich having embedded, slightly oversized wires. These oversized wires are then removed by appropriate means and plated magnetic wires are then inserted into the formed cavities or channels. A printed circuit cable is then cemented over the sandwich to form a memory plane.

A variation of the above invention comprises removing the oversized wires only after the printed circuit cable is in position. Plated wires are then placed in the slightly oversized cavities. In accordance with this technique, there is less opportunity to damage the plated wires when bonding the word cable to the sandwich.

Obviously many modifications and variations of the present invention are possible in the light of the above teachings. It is therefore to be understood that within the scope of the appended claims, the invention may be practiced otherwise than is specifically described.

What is claimed is:

1. A memory plane comprising:

a. an insulating means having a plurality of substantially parallel, completely enclosed channels located therein on the order of 25–50 to the inch;

b. a magnetizable wire located within each said channel;

c. a plurality of parallel conductive lines formed on a flexible insulating means positioned substantially orthogonal to each said magnetizable wire and externally surrounding said first mentioned insulating means, the intersection of a conductive line and a magnetizable wire comprising a bit position whereat binary information is stored, said channel being dimensioned to prevent stressing as well as easy insertion and removal of said wire.

2. A memory plane comprising:

a. an insulating means having a plurality of substantially parallel, completely enclosed channels on the order of 25–50 to the inch and having an 8 mils diameter;

b. a magnetizable wire on the order of 5 mils in diameter positioned within each said channel;

c. a plurality of conductive lines formed on a flexible insulating means oriented substantially orthogonal to said magnetizable wires and contiguous as well as external to said first mentioned insulating means, the intersection of a conductive line and a magnetizable wire comprising a bit position whereat binary information is stored, said channel being dimensioned to prevent stressing as well as easy insertion and removal of said wire.

3. A magnetic-wire memory matrix comprising:

a. first and second thermoplastic sheets placed in overlapping relationship to one another;

b. each of said sheets having a plurality of transverse grooves formed in the abutting faces thereof with the respective grooves being in registry to form a plurality of elongated openings of substantially uniform cross section;

c. a plurality of closely spaced parallel conductive members formed on a flexible insulating means extending at right angles to and externally surrounding said openings;

d. and a plurality of magnetic wire members each positioned within the respective opening formed between said thermoplastic sheets.

4. The magnetic-wire memory matrix in accordance with claim 3 wherein said magnetic wire members comprise a substrate upon which is coated a magnetic thin film.

5. The magnetic-wire memory matrix in accordance with claim 3 wherein said conductive members surrounding said thermoplastic sheets are elongated printed circuit conductors.

6. The magnetic-wire memory matrix in accordance with claim 3 wherein said first and second thermoplastic sheets are bonded to one another.

* * * * *